Feb. 12, 1957  P. E. LUCIEN  2,781,141
APPARATUS FOR THE SIMULTANEOUS PRESERVATION OF TWO DIFFERENT
PRODUCTS OUT OF CONTACT WITH EACH OTHER IN
THE INTERIOR OF A CONTAINER
Filed Dec. 19, 1951
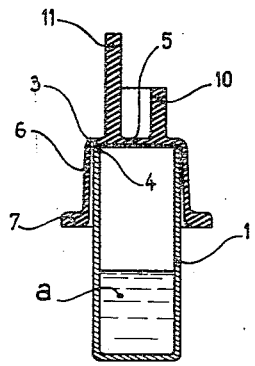
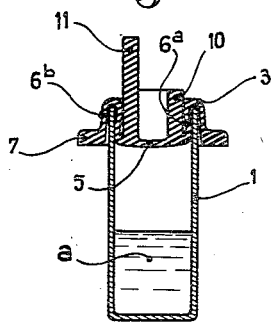
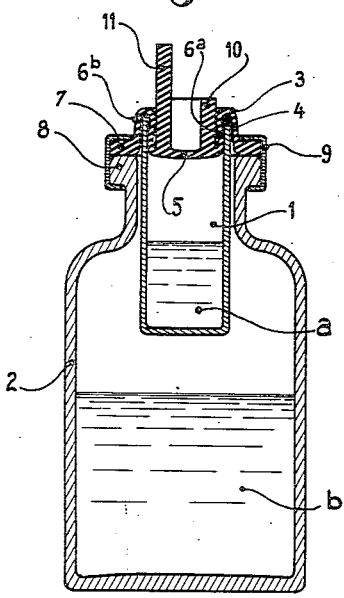
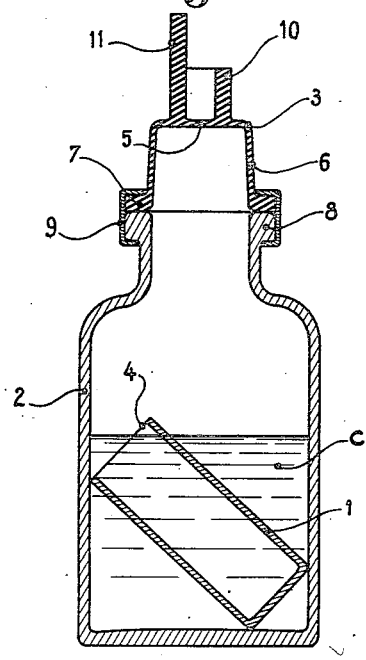
Inventor
PIERRE EDOUARD LUCIEN
By Linton and Linton Attorneys

United States Patent Office 2,781,141
Patented Feb. 12, 1957

2,781,141

APPARATUS FOR THE SIMULTANEOUS PRESERVATION OF TWO DIFFERENT PRODUCTS OUT OF CONTACT WITH EACH OTHER IN THE INTERIOR OF A CONTAINER

Pierre Edouard Lucien, Paris, France

Application December 19, 1951, Serial No. 262,416

Claims priority, application France November 6, 1951

1 Claim. (Cl. 215—6)

The purpose of the present invention is an apparatus for the simultaneous preservation of two different products out of contact with each other in the inside of a container, this apparatus permitting, first, this preservation of these two products out of contact with each other in the inside of this container and this for an indefinite period, then, a contacting of these two products at any desired moment.

According to the present invention, this apparatus comprises, in essence, an outer container holding one of these products and an inner receptacle in the said container and holding the other product, and it is characterized by:

(a) A stopper common to this container and to this inner receptacle.

(b) Means for temporarily and simultaneously assembling this stopper with the aperture of this inner receptacle and the aperture of this outer container.

(c) Means for separating this stopper from this inner receptacle alone with a view to the opening of this latter receptacle in the outer container and to the contacting of the two products in the said outer container still hermetically sealed by the stopper.

The present invention permits the realisation of numerous apparatus presenting these features and it comprises all these apparatus.

Among these may be mentioned:

1. Those in which the stopper is made of a deformable and elastic material.

2. This deformable and elastic material is:

(a) Rubber, (b) Any other material, natural or synthetic, of which the properties of suppleness and aptitude for deformation are, for the purposes of the present invention, similar to those of rubber.

3. Those in which the common stopper is made in one piece comprising a central part capable of being engaged, under the action of an outer pressure, in the aperture of the inner receptacle in such a way as to be pressed by its elasticity against the inner wall of this inner receptacle and to keep this latter closed after cessation of the outer pressure, the peripheral part of this stopper being, at the same time, provided with means of pressure against the rim of the aperture of the outer container and insuring thus the closure of this latter and this same central part permitting, then, at the desired moment, by an inverse deformation of its self under an outer pull, the separation of the stopper from this inner receptacle, the opening of the latter, the liberation of the latter and of its contents and the contacting of the two products hitherto kept isolated from each other, with the effects resulting from this contact, the outer container remaining closed until utilisation of the product resulting from this contact of the two initial products.

4. Those of the kind described above in 3, in which the part of the stopper situated between its rim and its central part is made in the form of a hood capping the part of the exterior wall of the inner receptacle adjacent to the aperture of the latter.

5. Those of one of the kinds described above characterised by an outer prehensible member integral with the central part of the stopper and permitting, by a push on it, the engaging of this central part in the inner receptacle and stopping the latter and by making it integral with the stopper and by a pull on it, separating this central part of the stopper and this inner receptacle by thus completely opening the latter and permitting the contact of the product which it contains with the product contained in the outer container.

6. In the case of a stopper of the kind described in 4 the arrangement on the outside of the bottom of this stopper, of a protuberance for setting the part of the stopper adjacent to this bottom and which is opposite to the inside wall of the inner receptacle, against this inside wall itself.

7. In the case of a stopper of the kind described in 6, the arrangement on the outer projection of the prehensible member described under 5.

Apparatus made in accordance with the invention are capable of numerous uses.

The present invention comprises:

1. In a general way, any apparatus according to any of those described above.

2. The elements constituting such apparatus and, namely their stoppers sealing simultaneously the inner receptacle and the outer container.

The attached diagrams given by way of example and which cannot, in any way, limit the scope of the present invention, show various methods of construction for apparatus made on the principle defined above.

In these drawings:

Fig. 1 is a vertical section made across the inner receptacle of this apparatus, this receptacle being covered by a stopper of one of the above types, this stopper being simply placed on this receptacle.

Fig. 2 is a vertical section of the same receptacle, this section being made after inserting the stopper in the receptacle and integration of these two elements.

Fig. 3 is a vertical section of the whole of the apparatus showing the inner receptacle provided with the stopper in the position of Fig. 2 after the introduction of this receptacle in the outer container and the application of the rim of the stopper on the neck of this outer container and attachment of the said rim to the said neck by a ring set on the said neck and the said stopper.

Fig. 4 shows the same container after extraction of the central part of the stopper from the inside of the inner receptacle and the fall of the latter receptacle into the container, the said fall determining the mixture of the products initially contained in the inner receptacle with the product contained in the outer receptacle and initially isolated from the preceding product.

In these various figures, the same reference signs designate the same elements.

1 is the inner receptacle containing a substance $a$, shown in the drawing as a liquid, but which could also be solid.

2 is the outer receptacle containing a substance $b$, here, liquid, likewise, but which could, also be solid; $c$ is the product resulting from the contact of the substances $a$ and $b$, which product can, in certain cases, be only a simple mixture of the substances $a$ and $b$. Here, the receptacle 1 has the form of a tube; but this form could be different and the receptacle 2 which here has the shape of an ordinary flask could likewise have any other shape.

3 is the stopper of the whole of the apparatus; 4 is the aperture of the receptacle 1. Here, the stopper 3 is of rubber; in Figs. 1–4 it has the shape of a thimble or a glove finger, 5 is its base, 6 its lateral wall, 7 the rim which terminates it.

This stopper is, first of all, placed in the aperture 4 of the receptacle having been previously supplied with the product a liquid or solid, here liquid, as has been said.

Being in this position, pressure is applied to its base 5 so as to engage the latter in the aperture 4 of the receptacle 1 (Fig. 2).

In this position, the part 6ª of the lateral wall of the stopper adjacent to the base 5 is applied against the internal face of the wall of the aperture 4 of the receptacle by the elasticity of the material itself constituting the stopper and the part 6ᵇ of this wall, adjacent to the rim 7 covers externally the upper part of this receptacle.

The stopper 3 being, thus, in position on the receptacle 1, this receptacle is placed on the neck 8 of the outer container 2 previously provided with the substance b and a ring 9, metallic or otherwise, is set, at the same time on the rim 7 of the stopper and the neck 8.

Then, at the desired moment, by an action exercised on the part 6ª and the base 5 of the stopper, this base is disengaged from the aperture 4 and moved to the position of Fig. 4. The receptacle 1 and its contents fall to the bottom of the flask 2 (Fig. 4).

To perfect the application of the part 6ª of the stopper against the internal wall of the receptacle 1, here, this base 5 is constructed with an outer annular protuberance 10.

This annular protuberance is, likewise, provided with a projection 11 serving as a prehensible member and permitting, by a simple push on it, the insertion of the base 5 in the interior of the receptacle 1; then, when the product a is to be put into contact with the product b by a simple pull on the same projection, the base 5 of the stopper can be disengaged from the aperture of this inner receptacle, thus liberating completely the latter and its contents; the products a and b are thus into contact and the effects resulting from this contact are then produced.

I declare that what I claim is:

An apparatus for simultaneously containing two different products out of contact with each other until mixture thereof is desired comprising in combination an outer container for one product and having an access opening provided therein, an inner container for the other of said products and being detachably positioned through said outer container access opening, said inner container having an access opening positioned substantially concentric with and within said outer container access opening, a closure formed of a resilient material and common to both containers, said closure consisting of a base, a tubular deformable wall connected to and extending from one face of said base substantially perpendicular thereto, and having the access opening end portion of said inner container loosely extending therein, said wall in its inner container retaining position being bent having an inverted U-shaped cross-sectional configuration with the access opening end portion of said inner container extending therebetween, a rim extending from said wall and mounted on said outer container around said access opening thereof and a protuberance extending from the outer face of said base pressing said bent wall against said inner container for retaining said inner container in the access opening of said outer container and capable of being used as a handle for pulling said base and thereby straightening said wall whereby said inner container is released and drops by gravity into said outer container and means for retaining said rim in position on said outer container.

References Cited in the file of this patent

UNITED STATES PATENTS

| | | |
|---|---|---|
| 1,949,058 | Leguillon | Feb. 27, 1934 |
| 2,072,366 | Hein | Mar. 2, 1937 |
| 2,495,942 | Nosik | Jan. 31, 1950 |
| 2,615,448 | Fields | Oct. 28, 1952 |